United States Patent [19]

O'Halloran

[11] 4,267,824

[45] May 19, 1981

[54] SOLAR CONCENTRATOR

[75] Inventor: John T. O'Halloran, Glendale, Mo.

[73] Assignee: Hayakawa Associates, St. Louis, Mo.

[21] Appl. No.: 61,620

[22] Filed: Jul. 30, 1979

[51] Int. Cl.³ .............................................. F24J 3/02
[52] U.S. Cl. .................................. 126/426; 126/424; 126/438
[58] Field of Search ............... 126/426, 438, 439, 424; 350/289, 288

[56] References Cited

U.S. PATENT DOCUMENTS

| 4,003,638 | 1/1977 | Winston | 126/438 |
| 4,069,812 | 1/1978 | O'Neill | 350/211 |
| 4,088,121 | 5/1978 | Lapeyre | 126/424 |
| 4,126,123 | 11/1978 | Hall | 126/426 |
| 4,178,913 | 12/1979 | Hutchison | 126/438 |

*Primary Examiner*—Samuel Scott
*Assistant Examiner*—G. Anderson

*Attorney, Agent, or Firm*—Senniger, Powers, Leavitt and Roedel

[57] ABSTRACT

An inflatable solar concentrator comprising an elongate hollow member of relatively thin flexible material inflatable to an upright position in which it is generally in the form of a cone convergent from its upper to its lower end. The inflated member has a substantially transparent top of a material which transmits incident solar radiant energy, and a highly reflective inner conical surface which reflects downwardly and thereby concentrates the radiant energy. A rigid collar on the lower end of the member has a passage through it in communication with the interior of the member for supply of gas under pressure into the member to inflate it and for exit of gas from the member to collapse it. The member is mounted with its lower end above a heat absorbing surface for impingement on the surface of concentrated radiant energy.

10 Claims, 4 Drawing Figures

SOLAR CONCENTRATOR

BACKGROUND OF THE INVENTION

This invention relates generally to solar collectors and more particularly to solar collectors of the focusing type, namely, solar concentrators. Reference may be made to U.S. Pat. Nos. 4,052,976, 3,295,512, 1,442,696 and German publication No. 2,604,345 disclosing various solar concentrating devices.

SUMMARY OF THE INVENTION

Among the several objects of the present invention is the provision of an improved solar concentrator capable of producing relatively high temperatures for the production of electricity, for example; the provision of such a concentrator which is relatively lightweight and collapsible for convenient transport and storage; the provision of such a concentrator which is quick and easy to install and which may be mounted on a relatively small area of support structure; and the provision of such a concentrator which tracts the path of the sun.

Generally, an inflatable solar concentrator of the present invention comprises an elongate hollow member of relatively thin flexible material inflatable to an upright position in which it is generally in the form of a cone convergent from its upper to its lower end. The inflated member has a substantially transparent top closing its upper end of a material adapted to transmit incident solar radiant energy, and a highly reflective inner conical surface for reflecting downwardly and thereby concentrating solar radiant energy. A rigid collar around the lower end of the member has a passage through it in communication with the interior of the member for supply of gas under pressure into the member to inflate it and for exit of gas from the member to collapse it. Means is also provided for mounting the member with its lower end above a heat absorbing surface for impingement of the surface of concentrated radiant energy. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
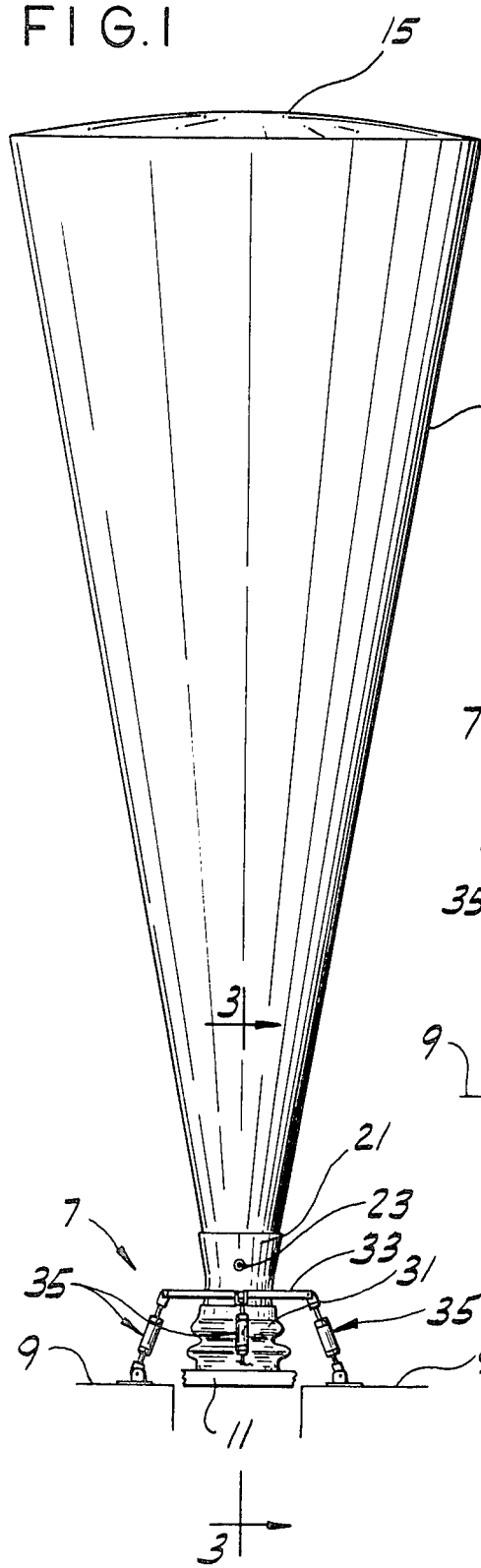
FIG. 1 is an elevation of a solar concentrator of the present invention in its inflated condition mounted on a support structure above a heat absorbing surface.
Figure 2:
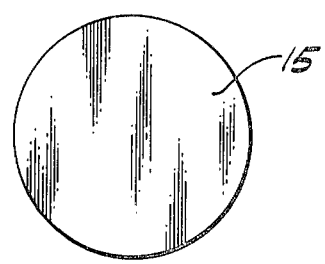
FIG. 2 is a reduced plan of FIG. 1.
Figure 3:
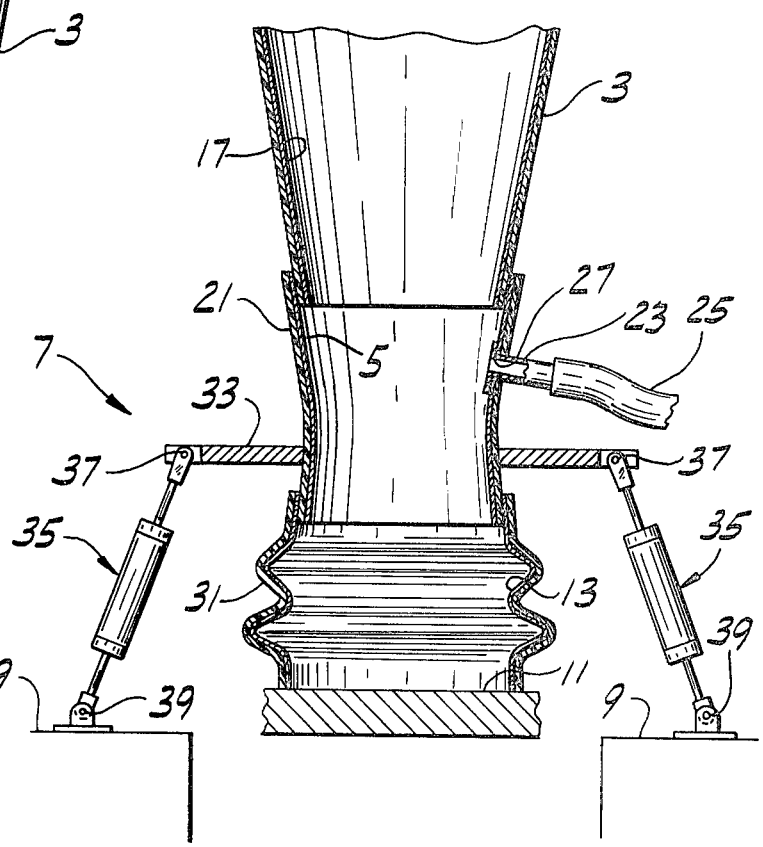
FIG. 3 is a vertical section taken on line 3—3 of FIG. 1.

Referring now to the drawings, and first more particularly to FIG. 1, an inflatable solar concentrator of the present invention is designated in its entirety by the reference numeral 1. The concentrator, shown in its inflated condition, comprises an elongate hollow member 3 generally in the form of a vertical right circular cone symmetrical about its central vertical axis and convergent from its upper to its lower end, the latter of which is open (FIG. 3) and surrounded by a rigid collar 5. It will be understood that the shape of member 3 may vary somewhat from that shown without departing from the scope of this invention. Indicated generally at 7 is means for mounting the member 3 on a support structure 9 (e.g., the roof of a building) with its lower end and the collar 5 thereon spaced above a stationary heat absorbing surface 11 for impingement on the surface of solar radiant energy concentrated by member 3. Means constituted by a flexible connector 13 connects the collar and the heat absorbing surface and forms a passage therebetween for passage of concentrated radiant energy onto surface 11 for heating it.

Figure 4:
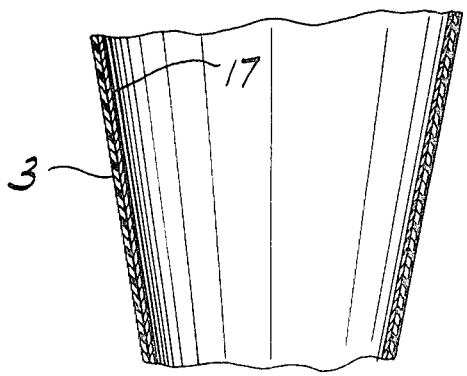
FIG. 4 is an enlarged portion of FIG. 3.

More particularly, member 3, which is of a relatively thin flexible material such as nylon, mylar or other suitable plastic, has a substantially transparent top 15 closing at its upper end for transmitting incident solar radiant energy, and a highly reflective inner conical surface 17 (FIG. 4) for reflecting downwardly and thereby concentrating incident solar radiant energy. The inner conical surface of the member may, for example, be constituted by an adhesive-backed solar reflective film developed by the Decorative Products Division of 3M Company of St. Paul, Minn. and marketed under the Scotchcal brand FE-K-244. The lower open end of the member 3 extends down inside the collar 5, which is relatively wide in vertical dimension, and is bonded to the upper margins of the collar in suitable fashion.

The collar 5 is generally circular in horizontal section and convergent from its upper end downwardly at approximately the same angle as the conical surface of member 3. The lower end of the collar is flared outwardly and is received inside the upper end of the flexible connector 13 which is secured in an appropriate manner to the collar. The collar may be of rigid spun aluminum, for example, having an inner specular surface capable of withstanding the relatively high temperatures (e.g., 300°–400° F.) generated by the concentrated solar energy passing through the collar. As indicated at 21, the outside of the collar is suitably insulated. For inflating the member 3 with air or other gas under pressure, the collar has a nipple 23 thereon constituted by a short length of metal tubing having a passage 27 therethrough in communication with the interior of the member 3. As shown, this tubing is receivable in one end of a hose 25 connected at its other end to the outlet of a suitable compressor (not shown). Of course, the nipple also constitutes means for bleeding gas from the member to collapse it so that it may readily be transported or stored.

The flexible connector 13, which forms a passage between the lower end of collar 5 and the heat absorbing surface 11 for passage of concentrated radiant energy, is preferably of a woven aluminum fabric having an inner specular coating (of aluminum, for example) capable of withstanding the high temperatures (e.g., 300°–400° F.) developed by member 3. The outside of the connector is wrapped in suitable insulation 31. The lower end of the connector is attached in any appropriate fashion to the heat absorbing surface 11, the latter of which may be constituted by a surface of a conventional air-to-liquid heat exchanger, or by the outer wall of a steel flash chamber, into which water flows for being flashed into steam for driving a turbine to produce electricity.

Means 7 for mounting the member 3 with its lower end above the heat absorbing surface 11 comprises an annular flange 33 encircling the collar 5 at its lower end and extending radially outwardly therefrom. This flange 33 is rigidly affixed to the collar in any suitable manner, as by welding. Means 7 further comprises a plurality (e.g., 4) of extensible and retractible pneumatic cylinder units, each indicated generally at 35. More specifically, each of these cylinder units is a conventional double-end rod cylinder of the double-acting type, with a rod extending from each side of the piston (not shown), one rod having a swivel connection 37 with the annular flange 31 and the other with the structural support 9, as indicated at 39. The cylinder units, which are spaced at equal (e.g., 90°) intervals around the solar concentrator, are operable by suitable pneumatic controls (not shown) for swinging the member 3 about an axis generally perpendicular to the central longitudinal axis of the member at its lower end for enabling the member to track the path of the sun and thereby to maximize the amount of solar radiant energy incident on the top 15 of member 3. Of course, the flexible connector 13 flexes as the member is pivoted about the aforesaid axis.

In use, the solar concentrator of this invention is, on operation of the pneumatic cylinder units 35, adapted to track the path of the sun and to concentrate solar radiant energy transmitted through the top 15 of member 3 for impingement on the heat absorbing surface 11 to heat it. The extent to which the radiant energy is concentrated, and thus the temperature to which the surface 11 is heated, will depend on the specific configuration of member 3, or, more specifically, on the ratio of D1/D2 where D1 is the diameter of member 3 at its closed upper end and D2 is the diameter at its open lower end. In this regard, it will be understood to those familiar in this field that as this ratio increases, at least within certain limits, the concentration of solar energy obtained also increases with a corresponding increase in the maximum temperature to which the heat absorbent surface is heated. The heat generated on surface 11 may then be used to produce electrical power, or to heat water, or in some other suitable manner.

Although it is preferable that member 3 and collar 13 be mounted above the heat absorbing surface in the above-described manner so as to enable the member to track the sun, it is also contemplated that the member 3 be mounted with the collar rigidly fastened (e.g., bolted) directly to the heat absorbing surface.

The fact that the solar concentrator of this invention is relatively lightweight and readily inflatable and deflatable makes transport and storage of the concentrator relatively convenient. Moreover, the member 3 may also readily be collapsed during adverse weather conditions (e.g., high winds) if so desired. Optionally, the member 3 may be of a material (e.g., rubberized sheet material) capable of stretching on inflation of the member so that the latter assumes a more compact form when collapsed. The fact that the member 3 is lightweight is further advantageous in that it is relatively easy to maneuver for tracking the path of the sun.

The solar concentrator 1 is also readily installed. Thus, the deflated member 3, collar 5 and flexible connector 13 are mounted above a heat absorbing surface (such as surface 11) simply by securing the piston rods of the pneumatic cylinder units 35 to the annular flange 33 on the collar and to a structural support. The member 3 is then inflated to the position shown in FIG. 1 in which it is self-supporting.

In view of the above, it will be seen that the several objects of the invention are achieved and other advantageous results attained.

As various changes could be made in the above constructions without departing from the scope of the invention it is intended that all matter contained in the above description or shown in the accompanying drawings shall be illustrative and not in a limiting sense.

I claim:

1. An inflatable solar concentrator comprising an elongate hollow member of relatively thin flexible material inflatable to an upright position in which it is generally in the form of a cone convergent from its upper to its lower end, said inflated member having a substantially transparent top closing its upper end of a material adapted to transmit incident solar radiant energy, and a highly reflective inner conical surface for reflecting downwardly and thereby concentrating said radiant energy, a rigid collar around the lower end of the member, a passage in communication with the interior of said member for supply of gas under pressure into the member to inflate it, and means for mounting the member with its lower end above a heat absorbing surface for impingement on the surface of concentrated solar radiant energy, said mounting means being adapted for mounting said member with its lower end and said collar thereon spaced above said heat absorbing surface, said solar concentrator further comprising a flexible connector having a highly reflective inner surface connecting said collar and the heat absorbing surface and forming a passage therebetween for passage of said concentrated radiant energy, said mounting means being operable for swinging said member with respect to said heat transfer surface about an axis generally perpendicular to the central longitudinal axis of the member at the lower end thereof for allowing the member to track the path of the sun, said connector being adapted to flex as the member is swung about said axis.

2. A solar concentrator as set forth in claim 1 wherein said hollow member, when inflated, is generally symmetrical about its central longitudinal axis and is generally circular in transverse section.

3. A solar concentrator as set forth in claim 1 wherein the lower end of said member extends down inside the collar and is bonded thereto.

4. A solar concentrator as set forth in claim 1 wherein said mounting means comprises a flange extending laterally outwardly from the collar and power means attached to the flange and operable for swinging the member about said axis.

5. A solar concentrator as set forth in claim 4 wherein said flange encircles the collar and is generally annular in shape and said power means comprises a plurality of extensible and retractible cylinder units, each of which is attached at one end to the flange and at its other end to a support structure.

6. An inflatable solar concentrator comprising an elongate hollow member of relatively thin flexible material inflatable to an upright position in which it is generally in the form of a cone convergent from its upper to its lower end, said inflated member having a substantially transparent top closing its upper end of a material adapted to transmit incident solar radiant energy, and a highly reflective inner conical surface for reflecting downwardly and thereby concentrating said radiant energy, a rigid collar around the lower end of the member, a passage in communication with the interior of said member for supply of gas under pressure into the member to inflate it, a heat absorbing surface at the lower end of the member, and means for mounting the member on a support structure with its lower end above said heat absorbing surface for impingement on the surface of concentrated solar radiant energy, said heat absorbing surface being adapted to be mounted in fixed position relative to said support structure and said mounting means being adapted for mounting said member with its lower end and said collar thereon spaced above said heat absorbing surface, said solar concentrator further comprising a flexible connector having a highly reflective inner surface connecting said collar and the heat absorbing surface and forming a passage therebetween for passage of said concentrated radiant energy, said mounting means being operable for swinging said member about an axis generally perpendicular to the central longitudinal axis of the member at the lower end thereof for allowing the member to track the path of the sun, said connector being adapted to flex as the member is swung about said axis.

7. A solar concentrator as set forth in claim 6 wherein said hollow member when inflated, is generally symmetrical about its central longitudinal axis and is generally circular in transverse section.

8. A solar concentrator as set forth in claim 6 wherein the lower end of said member extends down inside the collar and is bonded thereto.

9. A solar concentrator as set forth in claim 6 wherein said mounting means comprises a flange extending laterally outwardly from the collar and power means attached to the flange and operable for swinging the member about said axis.

10. A solar concentrator as set forth in claim 9 wherein said flange encircles the collar and is generally annular in shape and said power means comprises a plurality of extensible and retractible cylinder units, each of which is attached at one end of the flange and at its other end to a support structure.

* * * * *

UNITED STATES PATENT AND TRADEMARK OFFICE
CERTIFICATE OF CORRECTION

PATENT NO. : 4,267,824

DATED : May 19, 1981

INVENTOR(S) : John T. O'Halloran

It is certified that error appears in the above—identified patent and that said Letters Patent is hereby corrected as shown below:

Front page, item [73], after "Hayakawa Associates, St. Louis, Mo." should be inserted --a part interest--. Column 1, line 39, "of the" should read --on the--.

Signed and Sealed this

Twenty-seventh Day of October 1981

[SEAL]

*Attest:*

*Attesting Officer*

GERALD J. MOSSINGHOFF

*Commissioner of Patents and Trademarks*